United States Patent [19]
Dodgen

[11] Patent Number: 5,158,066
[45] Date of Patent: Oct. 27, 1992

[54] BARBECUE OVEN

[75] Inventor: John N. Dodgen, Humboldt, Iowa

[73] Assignee: Dodgen Industries, Inc., Humboldt, Iowa

[21] Appl. No.: 772,165

[22] Filed: Oct. 7, 1991

Related U.S. Application Data

[63] Continuation-in-part of Ser. No. 757,971, Sep. 12, 1991.

[51] Int. Cl.⁵ .............................................. F24B 3/00
[52] U.S. Cl. .................................. 126/25 R; 432/141; 99/427; 99/446
[58] Field of Search .......................... 126/25 AA, 25 R; 99/446, 427; 34/186; 432/141

[56] References Cited

U.S. PATENT DOCUMENTS

| | | | |
|---|---|---|---|
| 377,965 | 2/1888 | Stewart | 432/141 |
| 987,957 | 3/1911 | Clarey | 432/141 |
| 1,841,813 | 1/1932 | Houlis | 432/141 |
| 4,184,420 | 1/1980 | Podaras et al. | 99/427 |
| 4,300,523 | 11/1981 | Robertson et al. | 99/427 |
| 4,470,343 | 9/1984 | Didier | 126/25 R |
| 4,700,618 | 10/1987 | Cox | 126/25 R |

Primary Examiner—Carroll B. Dority
Attorney, Agent, or Firm—Zarley, McKee, Thomte, Voorhees & Sease

[57] ABSTRACT

A barbecue oven has a cooking compartment having a top, bottom and opposite sides. A first cooking apparatus is mounted in the cooking compartment and comprises a substantially vertical pair of spaced support brackets rotatable mounted about an axis of rotation. A drive shaft extends between the brackets and is coextensive with the axis of rotation. A plurality of spaced elongated horizontal cooking baskets are pivotally and removable secured to the brackets. Connecting elements connect the baskets to the brackets so that the baskets will maintain a lateral horizontal position as they are rotated about the axis of rotation. A power element is provided for rotating the brackets about the axis of rotation. A second cooking apparatus can also be mounted in the cooking compartment and can be either a conventional stationary horizontal grill, or can duplicate the structure of the first cooking apparatus. Vertically disposed fuel baskets are laterally positioned with respect to the food cooking area.

5 Claims, 4 Drawing Sheets

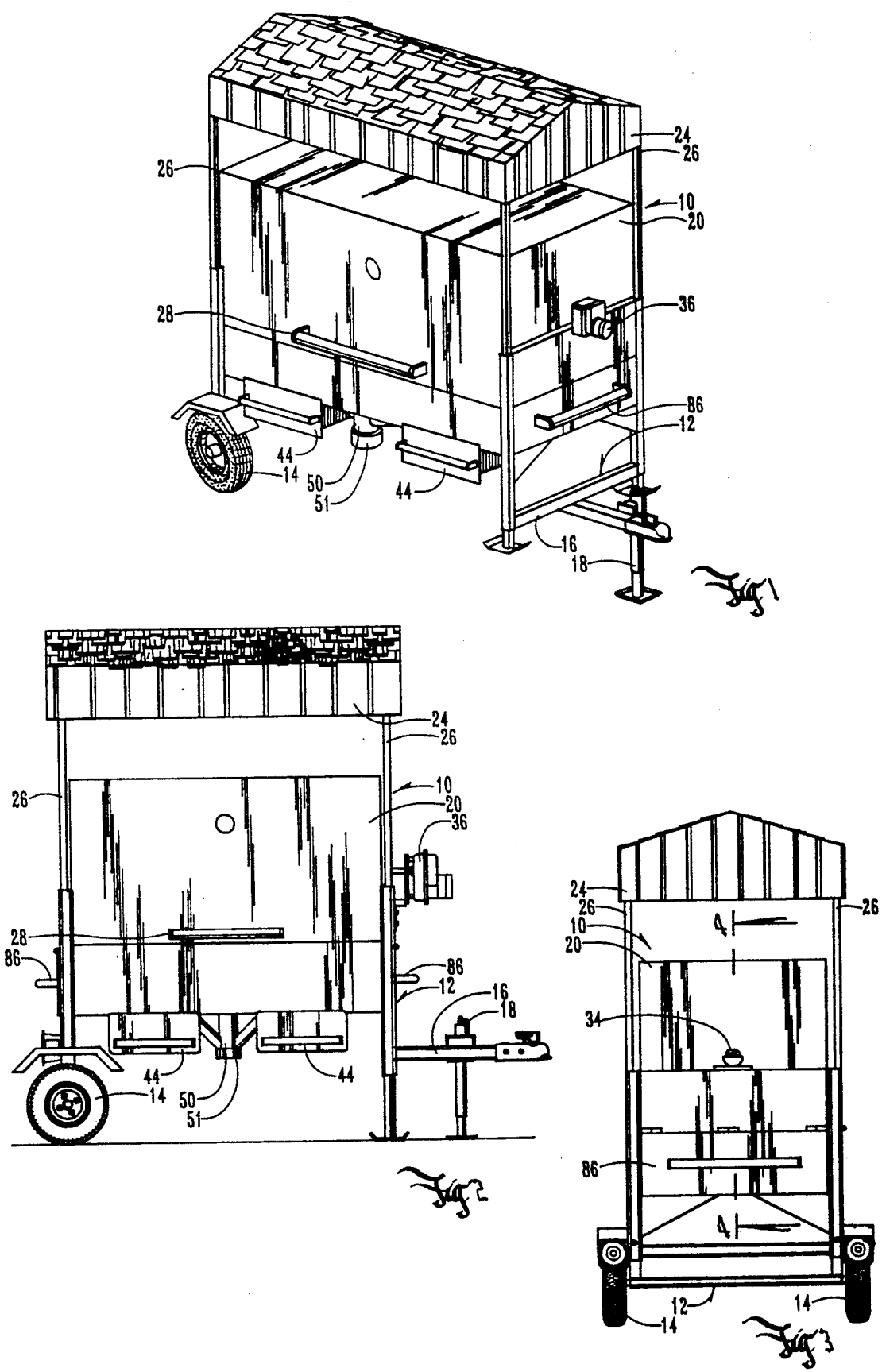

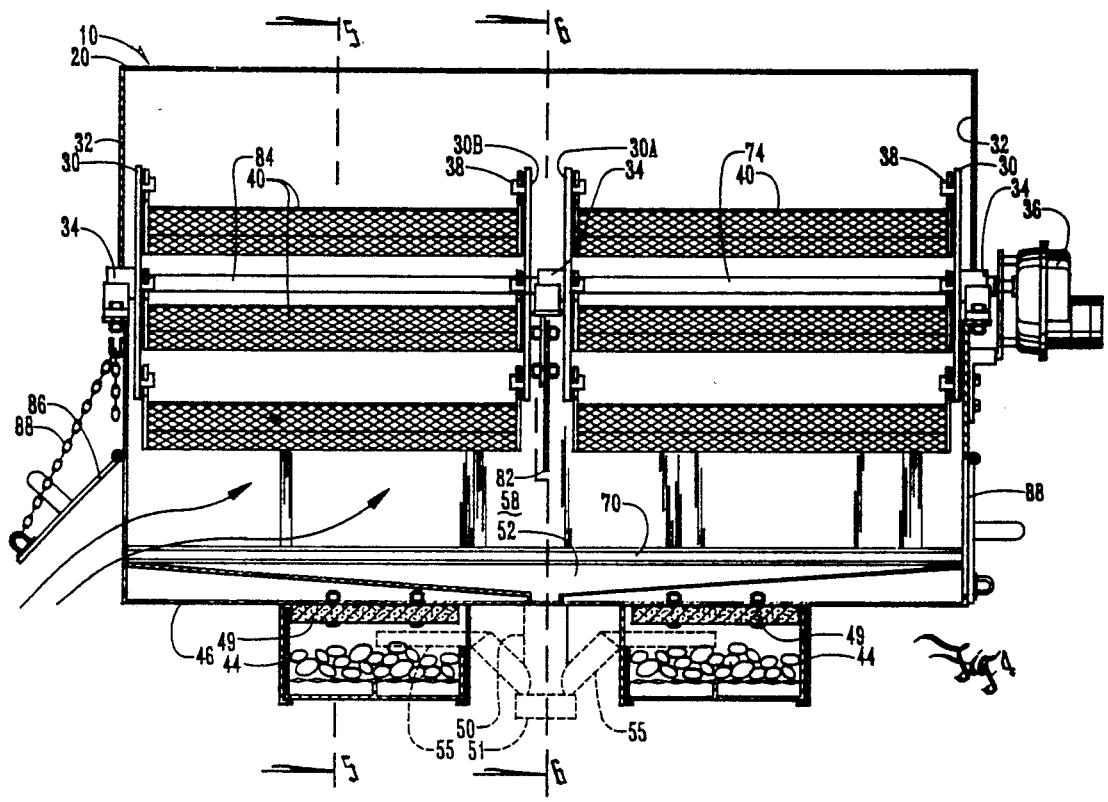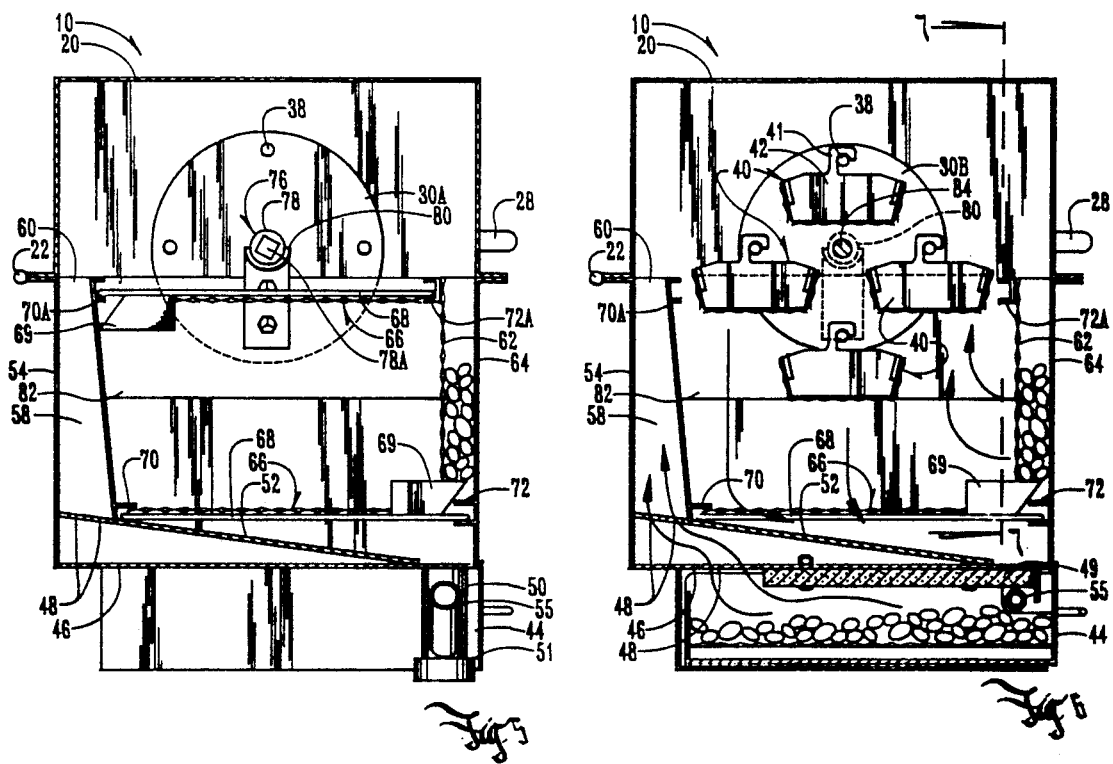

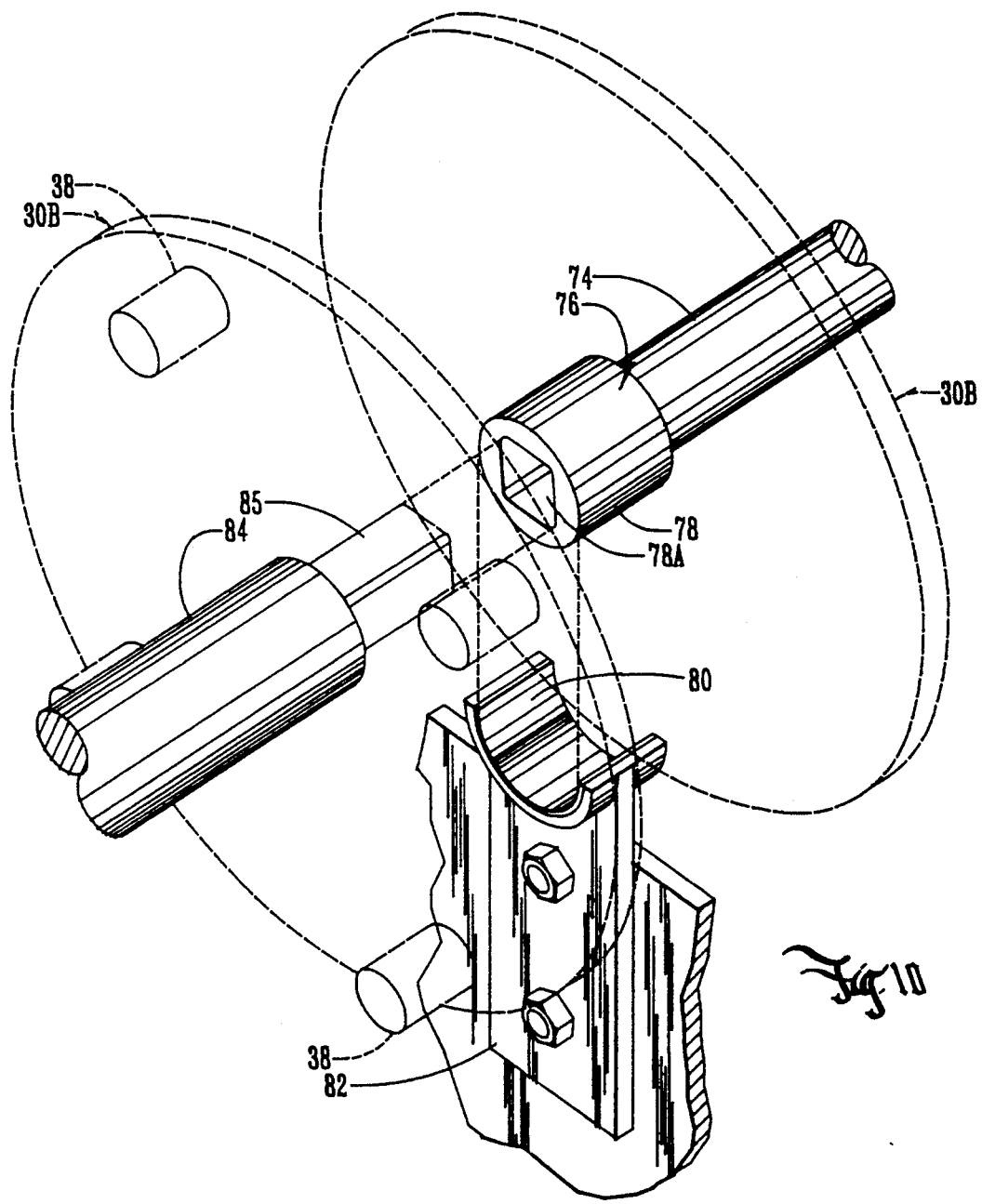

5,158,066

BARBECUE OVEN

This application is a continuation-in-part of co-pending application Ser. No. 07/757,971 filed Sep. 12, 1991.

BACKGROUND OF THE INVENTION

Prior barbecue ovens have used rotisseries utilizing a plurality of elongated baskets hung on radial arms of rotating spaced brackets. However, these units are hard to clean, and it is difficult to place food in the baskets and to remove hot food from the baskets. Furthermore, not all food is suitable for cooking from the baskets. In addition, grease and the like falling downwardly from the baskets causes undesirable flame flare-up and smoke.

It is therefore a principal object of this invention to provide a barbecue oven which has a plurality of rotatably mounted baskets which are removable from this supporting structure to permit easy loading and unloading.

A further object of this invention is to provide a barbecue oven which is removable from this supporting structure to permit easy loading and unloading and which will permit the use of a horizontal cooking grill when the baskets are not needed for cooking.

A still further object of this invention is to provide a barbecue oven which is removable from this supporting structure to permit easy loading and unloading and which has vertical fuel baskets laterally positioned with respect to the food cooking area to prevent grease dropping from the food from falling on the hot combustible fuel.

These and other objects will be apparent to those skilled in the art.

SUMMARY OF THE INVENTION

The barbecue oven of this invention comprises a cooking compartment having a top, bottom and opposite sides. A first cooking apparatus is mounted in the cooking compartment and comprises a substantially vertical pair of spaced support brackets rotatable mounted about an axis of rotation. A drive shaft extends between the brackets and is coextensive with the axis of rotation. A plurality of spaced elongated horizontal cooking baskets are pivotally and removable secured to the brackets. Connecting elements connect the baskets to the brackets so that the baskets will maintain a lateral horizontal position as they are rotated about the axis of rotation. A power element is provided for rotating the brackets about the axis of rotation. A second cooking apparatus can also be mounted in the cooking compartment and can be either a conventional stationary horizontal grill, or can duplicate the structure of the first cooking apparatus. Vertically disposed fuel baskets are laterally positioned with respect to the food cooking area.

BRIEF DESCRIPTION OF THE DRAWINGS

FIG. 1 is a perspective view of the barbecue oven of this invention;

FIG. 2 is a side elevational view thereof;

FIG. 3 is an end elevational view thereof as seen from the left hand end of FIG. 2;

FIG. 4 is an enlarged scale vertical sectional view taken on line 4—4 of FIG. 3;

FIG. 5 is a vertical sectional view taken on line 5—5 of FIG. 4;

FIG. 6 is a vertical sectional view taken on line 6—6 of FIG. 6;

FIG. 10 is an enlarged scale perspective view of the interconnection between the drive axles of the two cooking units shown in FIG. 4.

DESCRIPTION OF THE PREFERRED EMBODIMENT

Figure 7:
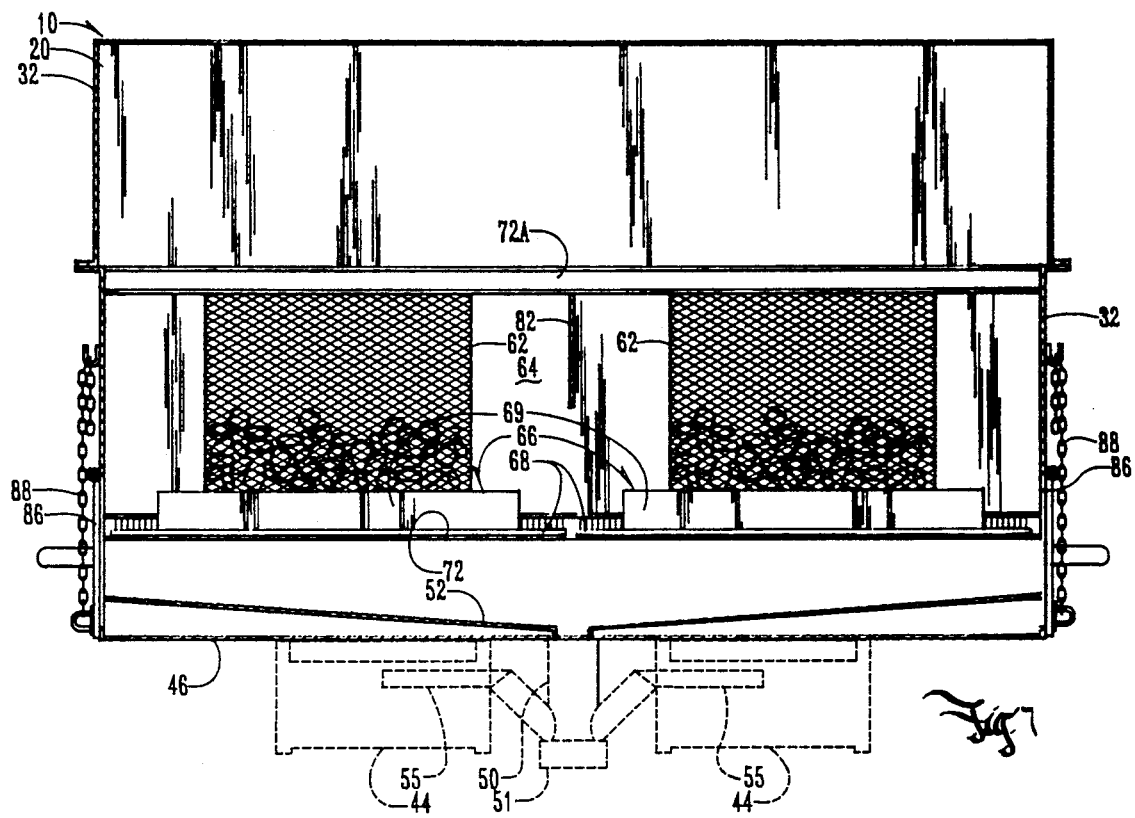
FIG. 7 is a vertical sectional view taken on line 7—7 of FIG. 6.

The numeral 10 designates a cooking oven mounted on trailer frame 12 which has a pair of wheels 14 at one end, and a tongue 16 at the other end supported by retractable jack 18. A lid 20 covers the top of the oven and is connected thereto by hinges 22. (FIGS. 5 and 6). A roof shelter 24 extends over oven 10 and is supported on posts 26 secured by any convenient means to the ends of the oven. Handle 28 (FIG. 1) is secured to the front of lid 20 to facilitate opening and closing the same.

A circular plate 30 (FIGS. 5 and 6) is rotatably mounted on the inner face of each of the ends 32 of oven 10 by means of bushings 34. An electric motor 36 with suitable controls (not shown) is connected to one end 32 of oven 10 and connected by any convenient means through the bushing 34 to the adjacent plate 30. Each plate 30 has four horizontal arms 38. Elongated trays 40 extend between corresponding arms 38 on each plate 30, (and plates 30A and 30B) and are rotatably secured to the outer ends of the arms 38. The trays 40 are offset from the ends of the arms 38 by hooks 41 on tray ends 42 which causes the trays 40 to always hang from the arms 38 in transverse horizontal plates. Plates 30A and 30B are identical to plates 30.

Two combustion material boxes 44 are secured to the bottom 46 of oven 10. Bottom 46 is perforated at 48 above the trays 40. Insulating ceramic plates 49 are secured to the lower side of bottom 46 above the boxes 44 to protect bottom 46 from the heat of combustion and to convey the heat through the perforation at 48. A grease cylinder 50 extends downwardly from bottom 46 inbetween boxes 44, and a removable cap 51 is secured to the bottom end thereof. Tubes 55 extend upwardly and thence horizontally from the bottom of cylinder 50 to the upper portion of boxes 44.

A grease floor 52 extends downwardly from the rear wall 54 of oven 10, and from ends 32, to terminate at the top of grease cylinder 50 which can be designated as a grease collection area. The back portion of floor 52 is perforated at 56. An elongated flue 58 or chimney is mounted over perforations 56, and its open upper end 60 terminates near the level of any tray 40 that is in the "9 o'clock" position of the tray 40 shown in FIG. 5.

Grease falling from cooking food on trays 40 falls to floor 52, and flows by gravity to the top of cylinder 50. If it is desired to dispose of the grease, cap 51 is removed from cylinder 50, and a disposal receptacle is placed below cylinder 50. If it is desired to recycle the grease drippings, the cap 51 is left in place. As the grease drippings accumulate and fill cylinder 50, tubes 55 are also filled with grease. When the cylinder 50 is almost filled with grease, the grease in tube 54 overflows and trickles into combustion boxes 44 where it is gradually burned by ignited charcoal or the like in boxes 44. Grease in tubes 55 will not ignite because there is no air to support combustion in the tubes. Heat and a controlled amount of smoke from the ignition of this grease pass upwardly through perforations 48 and 56 into flue 58 where they are exhausted from the flue in close proximity to the rotating trays 40.

Figure 8:
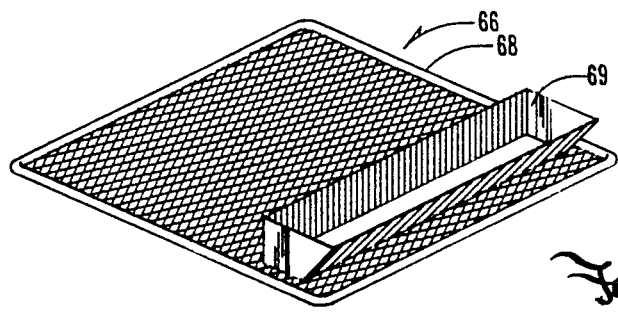
FIG. 8 is a perspective view of an optional food cooking grill.
Figure 9:
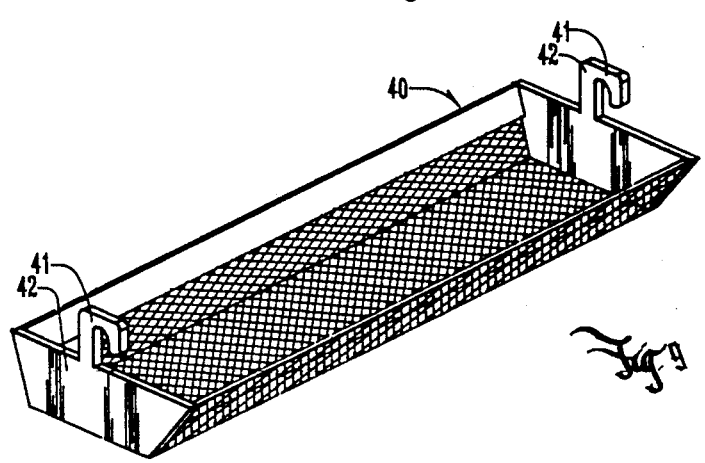
FIG. 9 is a perspective view of a food cooking basket.

With reference to FIGS. 5, 6 and 7, vertically disposed perforated fuel baskets 62 are mounted adjacent the forward wall portion 64. Baskets 62 are open at the tops and bottom threof. As shown in FIG. 8 a grill 66 with a perimeter rim 68 and an elongated closed bottom hopper 69 is mounted in channels 70 and 72 (FIGS. 5 and 6) so that hopper 69 partially penetrates the space within the lower end of baskets 62 to collect the ashes from burned charcoal in the baskets. As will be discussed hereafter, a grill 66 can be inverted and placed in channels 70A and 72A to serve as an alternate cooking grill when at least one of the rotisseries are not in use.

A power shaft 74 extends between plate 30 which is adjacent motor 36 and inner plate 30A. Shaft 74 is adapted to be rotated by motor 36. The inner end 76 of shaft 74 extends through plate 30A and terminates in a circular socket 78 which rotatably rests on open bearing 80. Bearing 80 is secured to plate 82 (FIG. 10). Plate 82 (FIG. 7) extends transversely across the center of oven 10.

Power shaft 84 has a male socket portion 85 which extends through plate 30B and into socket opening 78A. The other end of shaft 84 is secured to plate 30 adjacent the end 32 of oven 10 opposite to motor 36. By sliding shaft 84 to the left as seen in FIG. 10, shaft 84 can be detached from shaft 74. The outer ends of shafts 74 and 84 are mounted in bushings 34 which are open (not shown) as is bearing 80. This permits the shafts 74 and 84 to be removed from oven 10 along with baskets 40 if conventional cooking is desired. In that case, the grill or grills 66 can be mounted in their upper positions in channels 70A and 70B (FIG. 5) and used as a cooking surface. Also, only shaft 84 can be removed while shaft 74 is retained to also provide rotisserie cooking while a grill 66 is used in place of shaft 74, as discussed above, for conventional cooking.

Draft gates 86 with or without adjustable chains 88 are pivotally secured to the ends of oven 10 (FIG. 4) whereby the draft of air into oven 10 can be selectively adjusted.

The baskets 40, particularly in conjunction with fuel baskets 64, provide a unique and efficient cooking environment. Food can be easily and quickly placed on baskets 40 which can be easily removed from or placed into oven 10 as needed for cleaning or placement of food to be cooked.

It is therefore seen that this invention will accomplish at least all of the stated objectives.

I claim:

1. A barbecue oven, comprising,
    a cooking compartment having a top, bottom, and opposite ends,
    a first cooking means mounted in said cooking compartment and comprising a pair of spaced substantially vertical support brackets rotatably mounted about an axis of rotation in said cooking compartment,
    a first drive shaft extending between said brackets and being coextensive with said axis of rotation,
    a plurality of spaced elongated horizontal cooking baskets pivotally and removably secured to said brackets,
    connecting means connecting said baskets to said brackets so that said brackets will maintain a lateral horizontal position as they are rotated about said axis of rotation,
    said connecting means comprising open hooks on said baskets hanging by gravity from oppositely spaced arms protruding from said brackets to permit said baskets to be easily removed from and placed into said oven for cleaning or placement of food therein,
    means for rotating said brackets about said axis of rotation, and a normally stationary horizontal cooking grill mounted in said cooking compartment laterally adjacent said first cooking means.

2. The device of claim 1 wherein a fuel basket is mounted in said cooking compartment at one side of said first cooking means to provide cooking heat to said cooking compartment when containing ignited cooking fuel, but to be free from receiving grease particles which might fall from food being cooked in said cooking brackets.

3. A barbecue oven, comprising,
    a cooking compartment having a top, bottom, and opposite ends,
    a first cooking means mounted in said cooking compartment and comprising a pair of spaced substantially vertical support brackets rotatably mounted about an axis of rotation in said cooking compartment,
    a first drive shaft extending between said brackets and being coextensive with said axis of rotation,
    a plurality of spaced elongated horizontal cooking baskets pivotally and removably secured to said brackets,
    connecting means connecting said baskets to said brackets so that said brackets will maintain a lateral horizontal position as they are rotated about said axis of rotation,
    said oven having means forming a grease collecting area, means forming a combustion chamber;
    and means connecting said grease receptacle with said combustion chamber so that grease will flow into said combustion chamber, outside of said cooking compartment; means forming a passage for combustion gases from said combustion chamber to said cooking compartment; means connecting said grease collection space with a grease receptacle located outside of said cooking compartment; and means for rotating said brackets about said axis of rotation.

4. The device of claim 3 wherein a said connecting means is comprised of tube means extending upwardly from a bottom of said grease receptacle towards said combustion chamber, and terminating at a level below a top of said grease receptacle.

5. The device of claim 3 wherein said grease receptacle has a closable drain means.

* * * * *